(12) United States Patent
Sugihara et al.

(10) Patent No.: US 6,391,997 B1
(45) Date of Patent: May 21, 2002

(54) METHOD FOR PRODUCING DIENE-BASED RUBBER POLYMER LATEX

(75) Inventors: Masaki Sugihara; Hideaki Makino; Kouji Matsumura; Shinji Furuta; Makoto Kawano, all of Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/623,600

(22) PCT Filed: Mar. 3, 1999

(86) PCT No.: PCT/JP99/01026

§ 371 Date: Sep. 5, 2000

§ 102(e) Date: Sep. 5, 2000

(87) PCT Pub. No.: WO99/45034

PCT Pub. Date: Sep. 10, 1999

(30) Foreign Application Priority Data

Mar. 5, 1998 (JP) .......................................... 10-053672

(51) Int. Cl.⁷ .............................................. C08F 136/00
(52) U.S. Cl. ........................ 526/340.1; 526/61; 526/73; 526/78; 526/79; 526/80; 526/87; 526/335; 526/340.2; 526/340.3
(58) Field of Search ............................ 526/61, 73, 78, 526/79, 80, 87, 335, 340.2, 340.3, 340.1

(56) References Cited

U.S. PATENT DOCUMENTS 3,563,946 A * 2/1971 Miller et al. ................ 260/29.7
5,703,189 A * 12/1997 Tsuji et al. .................. 526/338

FOREIGN PATENT DOCUMENTS

JP          54-3511         2/1979

* cited by examiner

*Primary Examiner*—David W. Wu
*Assistant Examiner*—William K. Cheung
(74) *Attorney, Agent, or Firm*—Oblon, Spivak, McClelland, Maier & Neustadt, P.C.

(57) ABSTRACT

A process for production of diene rubber polymers wherein, during production of a diene rubber polymer by emulsion polymerization, the polymerization is initiated using a portion of the starting material and the polymerization is continued with either continuous or intermittent dropwise addition of the remainder of the starting material during the polymerization, and wherein at least ½ of the total amount of the water and of the monomer in the starting material used is added dropwise during the polymerization, and the temperature of the dropwise added water and monomer is kept to at least 20° C. below the polymerization temperature. The process can produce industrially useful diene rubber polymer latexes at a high productivity rate.

5 Claims, No Drawings

METHOD FOR PRODUCING DIENE-BASED RUBBER POLYMER LATEX

TECHNICAL FIELD

The present invention relates to a process for production of diene-rubber polymer latexes. The process can notably improve yields in the production of industrially useful diene rubber polymer latexes.

BACKGROUND ART

Diene rubber polymers are widely known as elastomers used in ABS resins, MBS resins and the like, and they are usually produced by emulsion polymerization. Such emulsion polymerization has traditionally been carried out by batch processes. In the case of batch polymerization, however, heat removal efficiency is low with larger volume vessels. When larger-sized vessels are used, therefore, fluctuations in the polymerization rate can hamper heat removal of the polymerization heat, often leading to an uncontrolled reaction. This reduces reproducibility of the latex product between batches, and can make it impossible to achieve stable production.

In order to prevent such a reduction in reproducibility of the latex product between batches, there has already been proposed, in Japanese Examined Patent Publication No. 54-3511, an improved batch production process aimed at controlling the polymerization temperature during batch polymerization reactions. In this process, polymerization is carried out while continuously or intermittently adding the monomer and a liquid composed mainly of water to the reactor, which is kept at high activity under high temperature conditions. The process prevents uncontrolled polymerization reaction since the unreacted monomer is not allowed to reside in large amounts in the polymerization system during the reaction, while a heat removal effect is obtained by slight sensible heat corresponding to the difference in the reaction temperature induced by the dropwise addition of water, and it is therefore possible to control the polymerization temperature in a more stable manner than with ordinary batch polymerization.

At the same time there has been a growing demand for further improved productivity in recent years as diene rubber polymers find more and more useful applications. However, despite the more satisfactory control of the polymerization temperature compared to other batch reactions, only minimal improvement in heat removal efficiency can be achieved because of the small amount of water that is added dropwise. That is, while the aforementioned publication discloses that dropwise addition of the monomer allows control of the polymerization rate and that dropwise addition of the water provides a slight heat removal-effect, no method has yet been known that takes maximum advantage of this knowledge for an adequate increase-in heat-removal efficiency and for a more notable increase in productivity.

DISCLOSURE OF THE INVENTION

It is therefore an object of the present invention to provide a process for the production of industrially useful diene rubber polymer latexes that affords very high productivity.

As a result of diligent research aimed at overcoming the problems mentioned above, the present inventors have completed the present invention upon finding that, in an improved batch process for the production of diene rubber polymer latexes whereby a portion of the starting material used for emulsion polymerization is added dropwise either continuously or intermittently between polymerization reactions, a notable improvement in polymerization productivity can be achieved if, during the polymerization, at least ½ of the total amount of monomer of the starting material used is added dropwise at a prescribed temperature while at least ½ of the total amount of water is also added dropwise at a prescribed temperature, in order to utilize the sensible heat of the dropwise added water.

In other words, the present invention provides a process for production of diene rubber polymers wherein, during production of a diene rubber polymer by emulsion polymerization, the polymerization is initiated using a portion of the starting material and the polymerization is continued with either continuous or intermittent dropwise addition of the remainder of the starting material during the polymerization, and wherein at least ½ of the total amount of the water and of the monomer in the starting material used is added dropwise during the polymerization, and the temperature of the dropwise added water and monomer is kept at least 20° C. below the polymerization temperature.

When the size of the reactor is increased to improve productivity, the jacket cooling power per unit volume of the reactor decreases with a greater reactor volume. Thus, even in polymerization rate ranges that allow production to be easily accomplished on a small scale, the jacket cooling power decreases with larger volumes, making it impossible to remove the heat generated by polymerization. Consequently, increasing the volume of the reactor necessitates reducing the polymerization rate to a speed corresponding to the heat removal efficiency: of the reactor, i.e., it has been necessary to take measures contrary to the goal of improving productivity. There has also been considered a method of increasing the heat removal efficiency by installing an auxiliary cooling apparatus such as a vent condenser, in order to achieve stable production without reducing the polymerization rate, but it has been difficult to achieve adequate improvement in productivity by such methods.

On the other hand, when sensible heat, due to dropwise addition of water, is utilized according to the process of the invention, the greater charging amount with the increased volume of the reactor requires a greater amount of dropwise water addition, and thus the heat removal efficiency increases in proportion to the scale of the apparatus. Consequently, using the process of the invention for a reactor with a large-sized volume can very efficiently improve productivity. However, the function and effect of the invention are not limited only to this type of situation, and for example, even when polymerization is conducted at a polymerization rate that allows sufficient heat removal with the heat removal efficiency of the polymerization reactor, the process of the invention may be applied for a notable reduction in the cooling load of the jacket-or condenser, for a highly effective result in terms of energy savings.

The following may be mentioned as objects for application of the improved batch production process of the invention.

(1) Improvement in heat removal efficiency by utilizing the sensible heat of dropwise addition of water and the monomer;

(2) Avoidance of situations in which the polymerization reaction temperature cannot be controlled; and (3) Energy savings.

As concerns (1), dropwise addition of a larger amount of water compared to the prior art, of at least ½ of the total amount of water which has the largest sensible heat, the sensible heat corresponding to the difference between the reaction temperature and the temperature of the water that is supplied is thereby utilized for heat removal. As a result, it is possible to achieve an improved heat removal efficiency that-has not been possible by the prior art, and to thereby notably improve productivity.

As concerns (2), since the total amount of monomer is not charged from the start, as is done in the prior art, it is possible to control the reaction temperature by stopping the dropwise addition of the monomer, even when the polymerization reaction temperature can no longer be controlled.

As concerns (3), in normal batch polymerization the entire amounts of the water, monomer, emulsifier, etc. are charged prior to polymerization, and after heating to the prescribed temperature, the initiator or catalyst is introduced to start the polymerization. That is, heat energy is necessary to raise the charging temperature to the polymerization initiation temperature. According to the present invention, however, the amount of water and monomer in the initial charging composition that is charged before polymerization is no more than ½ compared to a batch process. Consequently, the energy required for a temperature increase can be reduced to correspond to the initial charging amount, so that the required energy can be considerably reduced compared to a batch process. In addition, a batch process has a very high polymerization rate during the stage after polymerization initiation known as the "zero-order reaction period" (when the conversion rate is in the range of about 0–70%), and the cooling load during this period is very high. However, according to the present invention, which utilizes the sensible heat of the water and monomer, the cooling load on the jacket and condenser can be notably reduced to provide a very high energy savings effect.

According to the invention, the improved heat removal efficiency due to the sensible heat of the water is utilized so that the charging amount may be increased or the polymerization concentration raised by the degree of improved heat removal efficiency, for greater productivity.

BEST MODE FOR CARRYING OUT THE INVENTION

The present invention will now be explained in fuller detail.

According to the invention, a diene rubber polymer means a polymer containing 50–100 parts by weight of a diene monomer component such as butadiene or isoprene per 100 parts by weight of the polymer.

The component other than the diene monomer is an ethylenically unsaturated monomer, of which examples include aromatic vinyl compounds such,as styrene, α-methylstyrene and the like, acrylic esters such as methyl acrylate, n-butyl acrylate and the like, methacrylic acid esters such as methyl methacrylate, ethyl methacrylate and the like, acrylonitrile, methacrylonitrile, etc.

In combination with the aforementioned monomers there may also be used crosslinking agents such as divinylbenzene, 1,3-butylene dimethacrylate, allyl methacrylate and the like, and chain transfer agents composed of mercaptanes, terpenes and the like.

The emulsifier to be used is not particularly restricted, and alkali metal salts of higher fatty acids such as disproportionate rhodinic acid, oleic acid or stearic acid, or alkali metal salts of sulfonic acids such as dodecylbenzenesulfonic acid, may be used either alone or in combinations of two or more.

The monomer and water that are added dropwise during the polymerization are each in amounts of at least ½ the total amount. At smaller amounts, the degree of heat removal due to sensible heat is insufficient, such that no notable improvement in productivity can be expected. It is preferred for the water and monomer to be added dropwise at ⅗ the total amount or,more during the polymerization. The amount of the initial composition charged in before polymerization must be, as a minimum, at least the minimum amount of liquid to allow stirring of the initial composition by the stirring blades installed in the reactor. That is, the liquid surface of the initial composition must be sufficient to submerge the blade at the lower level of the stirring blades.

According to the invention, water is added dropwise during the period requiring the greatest heat removal efficiency, and a portion of the polymerization heat is removed by the sensible heat of that water. This results in improved productivity due to an increased charging amount and greater polymerization concentration corresponding to the extra heat removal efficiency. For most cases of diene rubber polymer latex production by a batch process, polymerization proceeds by a zero-order reaction during the initial stage of polymerization in which the unreacted monomer is in excess in the polymerization system. In the later stage of polymerization in which the monomer is consumed, it becomes a first-order reaction in which the polymerization rate decreases as the conversion rate increases. According to results of investigation by the present inventors, it has been observed that when polymerization of a diene rubber is carried out at a constant temperature by a batch process, the polymerization proceeds at a constant polymerization rate up to a conversion rate of about 70%, after which consumption of the unreacted monomer in the reactor leads to a slower polymerization rate.

The same phenomenon is observed even with improved batch production processes, where polymerization proceeds by a zero-order reaction up to a conversion rate of 70% based on the total charging amount of the monomer, and the polymerization rate decreases when the conversion rate exceeds 70%. Consequently, since the purpose of the dropwise addition of water is heat removal during the period of the constant polymerization rate that occurs while the conversion rate is 0–70% based on the total monomer charging amount in the reactor, it is preferably carried out when the conversion rate is in a range of 0–70% based on the total charging amount of the monomer. Also, the rate of dropwise addition of the water is preferably such that the heat removal rate due to the sensible heat of the water is at least 10% of the rate of heat generation by the polymerization. According to the invention; the temperature of the dropwise added water is at least 20° C. lower than the internal temperature of the reactor (polymerization tank). When this temperature difference is small, a sufficient degree of sensible heat cannot be achieved. The temperature difference is preferably at least 30° C., for which purpose there may be provided a cooling apparatus to cool the dropwise added water.

On the other hand, the dropwise addition of the monomer is carried out for the purpose of preventing an excess of unreacted monomer from accumulating during the reaction in the polymerization system, to avoid an unlimited polymerization reaction. Consequently, since the dropwise addition of the monomer and the dropwise addition of the water are carried out for different purposes,.the initial timing for each dropwise addition and the period in which each dropwise addition is carried out will often be different. It is therefore preferred to accomplish each dropwise addition with different apparatuses. Furthermore, in order to prevent accumulation of excess unreacted monomer in the polymerization system during the reaction, it is preferred to set the initial timing and the period of the monomer dropwise addition in line with the initial monomer charging amount and the polymerization rate, as is done according to the prior art, while it is also preferred to commence the dropwise addition of the monomer in a period in which the internal pressure of the polymerization tank is slightly lower than the saturated vapor pressure of the monomer, and to add the monomer dropwise at a rate that maintains that pressure. The temperature of the dropwise added monomer is not particularly restricted, but it is preferably at least 20° C. lower than the internal temperature of the reactor.

The present invention proposes an improved batch production process that can enhance productivity by improvement in the batch production process for production of diene rubber polymer latexes. The diene rubber polymer latexes produced by the process of the invention must therefore be equivalent to those obtained by ordinary batch production processes. According to results of investigation by the present inventors, no significant difference has been found in the diene rubber polymer latexes obtained by the process of the invention and those obtained by ordinary batch production processes in terms of the latex particle size, the volume of aggregates generated during polymerization, the latex solid portion concentration, etc.

The present invention will now be explained by way of examples which are, however, in no way intended to restrict the invention.

The abbreviations used through the examples and comparative examples are as follows.

BD: 1,3-butadiene
ST: styrene
GK: beef tallow fatty acid potassium salt
FK: disproportionate rhodinic acid potassium salt
DR: dextrose
RF: ferrous sulfate
PS: sodium pyrophosphate
BP: diisopropylbenzene hydroperoxide
DW: deionized water

EXAMPLE 1

The following SUS reactor equipped with a condenser and jacket cooling apparatus was used.

Tank volume: 70 L
Condenser specifications:
  Shell-and-tube condenser
  Heating surface area: 0.25 m$^2$ The following starting composition was added to the reactor.

| | |
|---|---|
| BD | 3.9 kg |
| ST | 1.1 kg |
| DW | 9.3 kg |
| GK | 110 g |
| FK | 110 g |
| DR | 30 g |
| BP | 20 g |

The reactor was heated, and the catalysts listed below were added during the heating (43° C.) to initiate the reaction. The internal temperature of the reactor was then kept at 58° C. The polymerization temperature was controlled by keeping a constant jacket temperature of 58° C. and controlling the condenser for an internal tank temperature of 58° C., and the heat removal load of the condenser was calculated from the cooling water flow rate of the condenser and the temperature difference between the inflowing and outflowing water.

| | |
|---|---|
| RF | 0.45 g |
| PS | 45 g |

The following components were added during the polymerization at the respective timings described below. The temperature of the added BD, ST and DW was 10° C.

BD: Dropwise addition was started 30 minutes after initiating polymerization, and ⅔ of the total amount (7.8 kg) was added dropwise during 90 minutes at an addition rate of 5.2 kg/hr.

ST: Dropwise addition was started 30 minutes after initiating polymerization, and ⅔ of the total amount (2.2 kg) was added dropwise during 90 minutes at an addition rate of 1.5 kg/hr.

DW: Dropwise addition was started 30 minutes after initiating polymerization, and ⅔ of the total amount (18.6 kg) was added dropwise during 150 minutes at an addition rate of 7.44 kg/hr.

BP: 10 g was added 150 minutes after initiating polymerization.

The heat balance at one hour and two hours after initiating polymerization is shown below. The degree of heat removal by the dropwise addition was calculated from the dropwise addition rate and the addition temperature. The polymerization heat was calculated from the conversion rate during polymerization. The results of measuring the conversion rate during polymerization are shown in Table 1.

TABLE 1

| | | Heat removal [kcal/hr] | | |
|---|---|---|---|---|
| Polymerization time [hr] | Polymerization heat [kcal/hr] | Heat removal due to dropwise addition | Condenser heat removal | Total |
| 1.0 | 1,015 | 500 | 485 | 985 |
| 2.0 | 1,015 | 500 | 510 | 1,010 |

These results, despite some experimental error, demonstrate that dropwise addition of the water and monomer allows heat removal of approximately 50% of the maximum polymerization heat generation rate. As explained above, an advantage is also achieved in terms of energy savings, since the cooling load on the condenser is reduced by about half.

COMPARATIVE EXAMPLE 1

The following starting composition was added to the same type of reactor used in Example 1.

| | |
|---|---|
| BD | 11.7 kg |
| ST | 3.3 kg |
| DW | 27.9 kg |
| GK | 110 g |
| FK | 110 g |
| DR | 30 g |
| BP | 30 g |

The reactor was heated, and the catalysts listed below were added during the heating (43° C.) to initiate the reaction. The internal temperature of the reactor was then kept at 58° C. The polymerization temperature was controlled by keeping a constant jacket temperature of 58° C. and controlling the condenser for an internal tank temperature of 58° C., and the heat removal load of the condenser was calculated from the cooling water flow rate of the condenser and the temperature difference between the inflowing and outflowing water.

| | | |
|---|---|---|
| RF | 0.45 g | |
| PS | 45 g | |

The heat balance at one hour and two hours after initiating polymerization is shown below. The polymerization heat was calculated from the conversion rate during polymerization. The results of measuring the conversion rate during polymerization are shown in Table 2.

TABLE 2

| | | | Heat removal [kcal/hr] | |
|---|---|---|---|---|
| Polymerization time [hr] | Polymerization heat [kcal/hr] | Heat removal due to dropwise addition | Condenser heat removal | Total |
| 1.0 | 1,015 | 0 | 910 | 910 |
| 2.0 | 1,015 | 0 | 1,090 | 1,090 |

The amount of aggregates produced during polymerization, the latex solid concentration, the latex particle size and the maximum polymerization rate for Example 1 and Comparative Example 1 are shown in Table 3. The latex particle size was measured using an absorbance method.

TABLE 3

| | Aggregates produced during polymerization [%] | Latex solid concentration [%] | Latex particle size [nm] | Maximum polymerization rate [%/hr] |
|---|---|---|---|---|
| Example 1 | 0.078 | 33.4 | 87 | 25 |
| Comp. Ex.1 | 0.082 | 33.4 | 88 | 25 |

The results in Table 3 demonstrate that, in terms of the properties of latexes obtained by production processes for diene rubber polymer latexes by emulsion polymerization, virtually no difference exists between the process of the invention and ordinary batch production processes.

The above results demonstrate that the process of the invention improves the heat removal efficiency compared to ordinary batch production processes, without influencing the properties of the resulting latex.

INDUSTRIAL APPLICABILITY

According to the present invention it is possible to achieve a notable effect of improved productivity and energy savings in the production of diene rubber polymer latexes by emulsion polymerization.

What is claimed is:

1. A process for production of diene rubber polymers wherein, during production of a diene rubber polymer by emulsion polymerization, the polymerization is initiated using a portion of the starting material and, the polymerization is continued with either continuous or intermittent dropwise addition of the remainder of the starting material during the polymerization, and wherein at least ½ of the total amount of the water and of the monomer in the starting material used is added dropwise during the polymerization, and the temperature of the dropwise added water and monomer is kept to at least 20° C. below the polymerization temperature.

2. The process of claim 1, wherein the amounts of water and monomer added dropwise during the polymerization are each at least ⅗ of the total respective amounts.

3. The process of claim 1, wherein the water is added dropwise at a rate such that the heat removal rate due to the sensible heat of the water is at least 10% of the rate of heat generation by the polymerization.

4. The process of claim 1, wherein the temperature of the dropwise added water is a temperature at least 30° C. lower than the polymerization temperature.

5. The process of claim 1, wherein said polymerization is carried out in a polymerization tank, wherein the dropwise addition of the monomer is commenced during a period in which the internal pressure of said polymerization tank is slightly lower than the saturation vapor pressure of the monomer, and the monomer is added dropwise thereafter at a rate that maintains that pressure.

* * * * *